(12) United States Patent
Lains et al.

(10) Patent No.: US 8,875,484 B2
(45) Date of Patent: Nov. 4, 2014

(54) GUIDE FOR AN IGNITION PLUG IN A TURBOMACHINE COMBUSTION CHAMBER

(75) Inventors: Dominique Maurice Jacques Lains, Melun (FR); Nicolas Christian Raymond Leblond, Lieusaint (FR); Christophe Pieussergues, Nangis (FR)

(73) Assignee: SNECMA, Paris (FR)

( * ) Notice: Subject to any disclaimer, the term of this patent is extended or adjusted under 35 U.S.C. 154(b) by 1022 days.

(21) Appl. No.: 12/949,375

(22) Filed: Nov. 18, 2010

(65) Prior Publication Data

US 2011/0113747 A1    May 19, 2011

(30) Foreign Application Priority Data

Nov. 19, 2009    (FR) ..................................... 09 05557

(51) Int. Cl.
  *F02C 7/266*    (2006.01)
  *F23R 3/06*    (2006.01)
  *F23R 3/60*    (2006.01)

(52) U.S. Cl.
  CPC ......... *F23R 3/06* (2013.01); *F23R 2900/03042* (2013.01); *Y02T 50/675* (2013.01); *F23D 2207/00* (2013.01); *F23R 2900/03043* (2013.01); *F23R 2900/00012* (2013.01); *F23R 3/60* (2013.01); *F02C 7/266* (2013.01)
  USPC .................................................... 60/39.821

(58) Field of Classification Search
  CPC ......... F02C 7/266; F23R 3/06; F23D 2207/00
  USPC ............ 60/39.821, 39.826, 39.827, 747, 776, 60/796, 759
  See application file for complete search history.

(56) References Cited

U.S. PATENT DOCUMENTS

| 3,048,015 A | 8/1962 | Barrelle et al. |
| 2009/0151361 A1* | 6/2009 | Audin et al. .................... 60/796 |
| 2009/0199564 A1* | 8/2009 | Pieussergues et al. .......... 60/752 |

FOREIGN PATENT DOCUMENTS

| EP | 1 258 682 A2 | 11/2002 |
| EP | 1 975 512 A2 | 10/2008 |
| EP | 2 071 241 A1 | 6/2009 |

OTHER PUBLICATIONS

U.S. Appl. No. 12/946,253, filed Nov. 15, 2010, Lains, et al.
French Preliminary Search Report issued Aug. 24, 2010, in French 0905557, filed Nov. 19, 2009.

* cited by examiner

*Primary Examiner* — J. Gregory Pickett
(74) *Attorney, Agent, or Firm* — Oblon, Spivak, McClelland, Maier & Neustadt, L.L.P.

(57) ABSTRACT

A turbomachine combustion chamber including at least one ignition plug carried by an outer casing and extending within guide means carried by a wall of the chamber, the wall forming a body of revolution. The guide means includes a tubular guide having the plug passing axially therethrough and mounted with axial and transverse clearance on a chimney fastened to the wall of the chamber and opening out into the chamber, the guide extending at least in part in an air flow stream outside the chamber. The guide means includes a deflector surrounding the portion of the guide that is situated in the air flow stream so as to reduce the aerodynamic pressure on the guide and reduce the contact pressure of the guide on the plug.

6 Claims, 4 Drawing Sheets

GUIDE FOR AN IGNITION PLUG IN A TURBOMACHINE COMBUSTION CHAMBER

FIELD OF THE INVENTION

The present invention relates essentially to guiding an ignition plug in an annular combustion chamber of a turbomachine such as an airplane turboprop or turbojet.

BACKGROUND OF THE INVENTION

An annular combustion chamber of a turbomachine comprises an annular end wall of the chamber connected to two shrouds that form two coaxial and substantially cylindrical bodies of revolution extending downstream, together with a fairing or cap that is fastened on the chamber end wall and that extends upstream.

The fairing guides the flow of air delivered by the compressor of the turbomachine and shares it between a central stream that feeds the combustion chamber and two outer streams that flow past the combustion chamber.

The air from the compressor is taken into the combustion chamber and mixed with fuel, and combustion of the mixture is initiated by at least one ignition plug mounted on an outer casing and passing through an orifice in the outer shroud.

In order to seal the combustion chamber at this orifice, it is known to mount guide means in the orifice, which means comprise a tubular guide having the plug passing axially therethrough, the guide being mounted with axial and transverse clearance on a chimney that is fastened to the outer shroud of the combustion chamber and that opens out into the combustion chamber via the above-mentioned orifice.

The clearance allows axial and radial movements to take place between the chamber and the outer casing as a result of differential expansion thereof during different stages of flight, without the plug coming into abutment against or pressing against the edges of the orifice in the outer shroud of the chamber.

Functional clearance also exists between the guide and the plug so that the guide can be moved in translation relative to the plug.

The guide extends in a peripheral stream defined by the outer casing and by the combustion chamber, such that the air flowing in said stream presses the guide against the plug. Contact between the cylindrical inside surface of the guide and the cylindrical outside surface of the plug takes place on the side that is upstream relative to the air flow.

The dimensions of the contact zone are small so the contact pressure or Hertz pressure is high.

In addition, vibration and the above-mentioned air flow tend to cause the guide to turn about the plug.

This gives rise to premature wear of the plug in the zone of contact between the guide and the plug.

OBJECT AND SUMMARY OF THE INVENTION

A particular object of the invention is to provide a solution to this problem that is simple, effective, and inexpensive.

To this end, the invention provides a turbomachine combustion chamber including at least one ignition plug carried by an outer casing and extending within guide means carried by a wall of the chamber, said wall forming a body of revolution, and including a tubular guide having the plug passing axially therethrough and mounted with axial and transverse clearance on a chimney fastened to the wall of the chamber and opening out into the chamber, the guide extending at least in part in an air flow stream outside the chamber, wherein the guide means comprise a deflector surrounding the portion of the guide that is situated in the air flow stream so as to reduce the aerodynamic pressure on the guide and reduce the contact pressure of the guide on the plug.

This serves to reduce wear of the plug significantly.

In an embodiment of the invention, the deflector is carried by the chimney.

Advantageously, the deflector extends over at least 180° around the guide.

Preferably, the deflector extends over 360° around the guide.

It is also advantageous for the height of the deflector to be greater than the height of the portion of the guide that extends in the air flow stream.

In a preferred embodiment of the invention, the chimney includes an annular rim extending radially outwards and defining an annular groove for assembling an annular collar of the guide, and the deflector is fastened to the annular rim of the chimney, e.g. by welding.

The invention also provides a turbomachine such as an airplane turboprop or turbojet that includes an annular combustion chamber of the invention.

BRIEF DESCRIPTION OF THE DRAWINGS

The invention can be better understood and other details, characteristics, and advantages of the invention appear on reading the following description made by way of non-limiting example with reference to the accompanying drawings, in which.

MORE DETAILED DESCRIPTION

Figure 1:
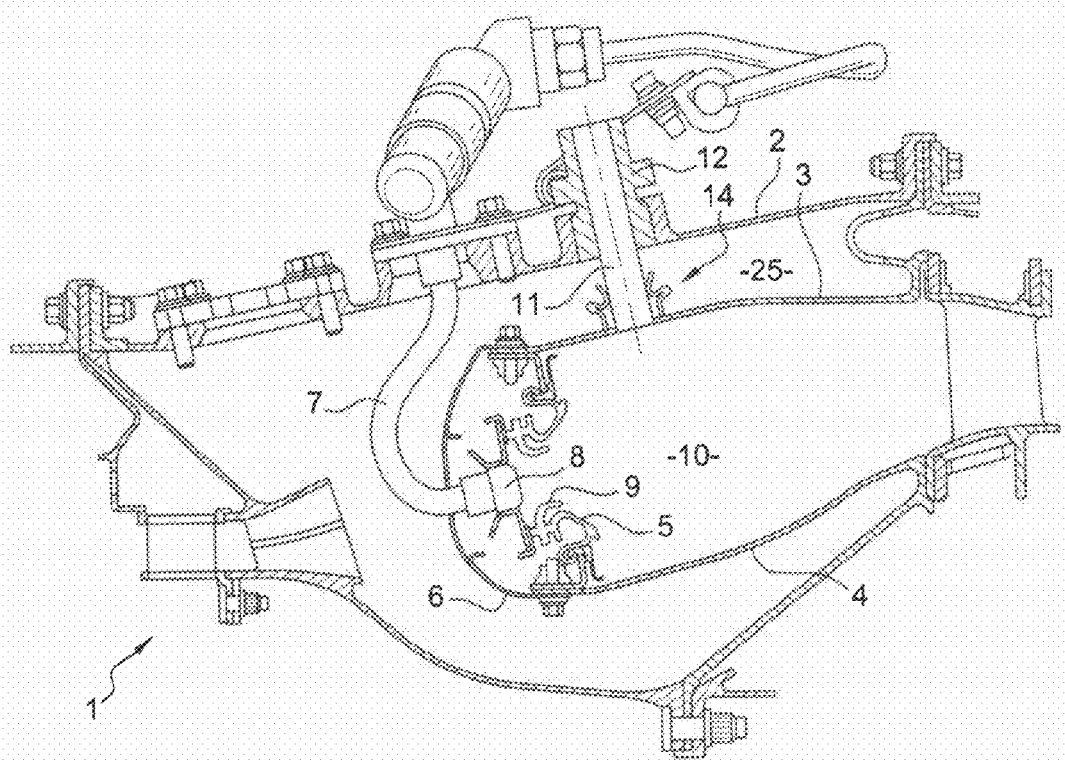
FIG. 1 is a longitudinal section view of a portion of a prior art annular combustion chamber.
Figure 2:
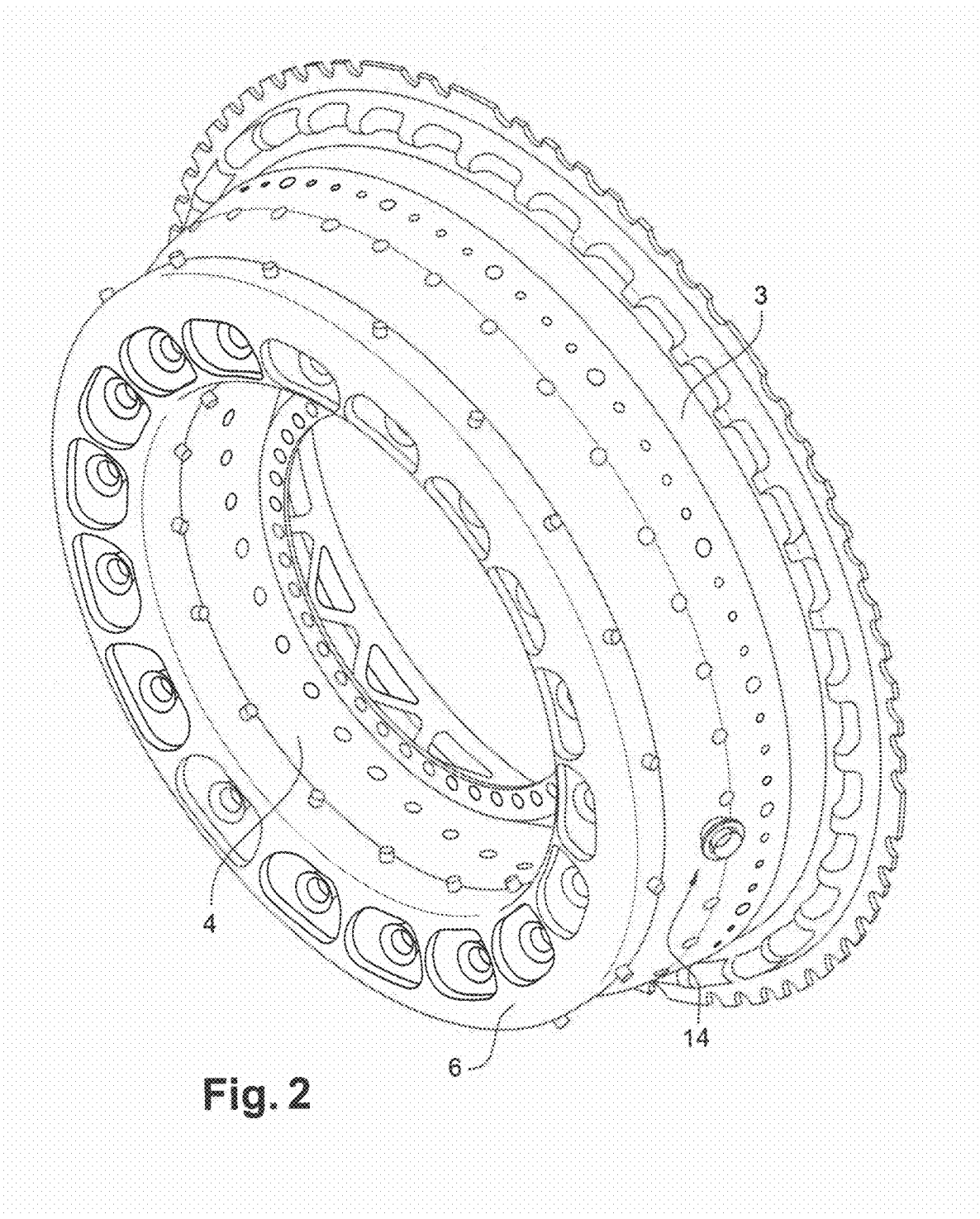
FIG. 2 is a perspective view of a portion of the FIG. 1 annular combustion chamber.

As shown in FIGS. 1 and 2, an annular combustion chamber 1 of a turbomachine such as an airplane turboprop or turbojet is mounted in an outer casing 2 and comprises an outer shroud 3 forming a body of revolution having a downstream annular flange for fastening to the casing 2, an inner shroud 4 forming a body of revolution having a downstream annular flange for mounting on an inner casing, and a chamber end wall 5 having fairings 6 mounted thereon and extending upstream.

Fuel injection pipes 7 distributed around the axis of the turbomachine open out through the end wall of the chamber 5 via injector heads 8. Injector systems 9 are arranged around each injector head 8.

The flow of air delivered by the compressor of the turbomachine is guided by the fairings 6, and shared between a central stream for feeding the combustion chamber 1 and two outer streams for flowing past the combustion chamber.

The injector systems 9 form a turbulent incoming air flow in a primary combustion zone 10 of the combustion chamber 1. This air is mixed with the fuel sprayed by the injector heads 8, the mixture being ignited by at least one plug 11.

The outer end of the plug 11 is mounted on an adapter 12 that is fastened to the outer casing 2. The inner end of the plug 11 passes through an orifice 13 (see FIG. 6) formed in the outer shroud 3 so as to be flush with the inside surface of the outer shroud 3.

Figure 3:
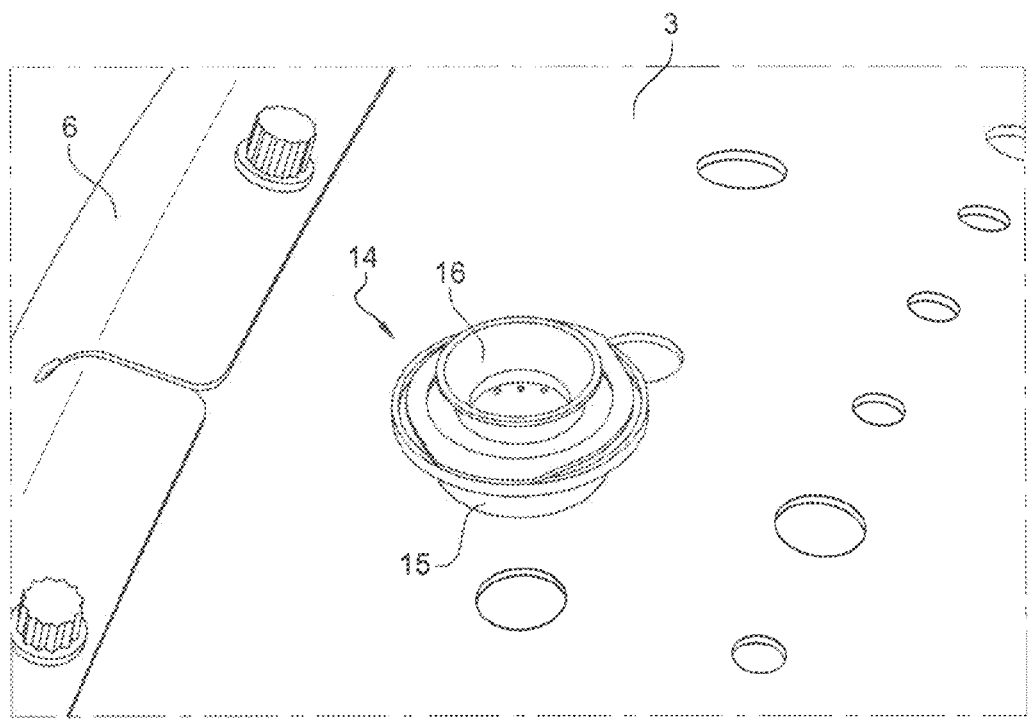
FIGS. 3 and 4 are enlarged views of plug-guide means used in the chamber of FIGS. 1 and 2.
Figure 4:
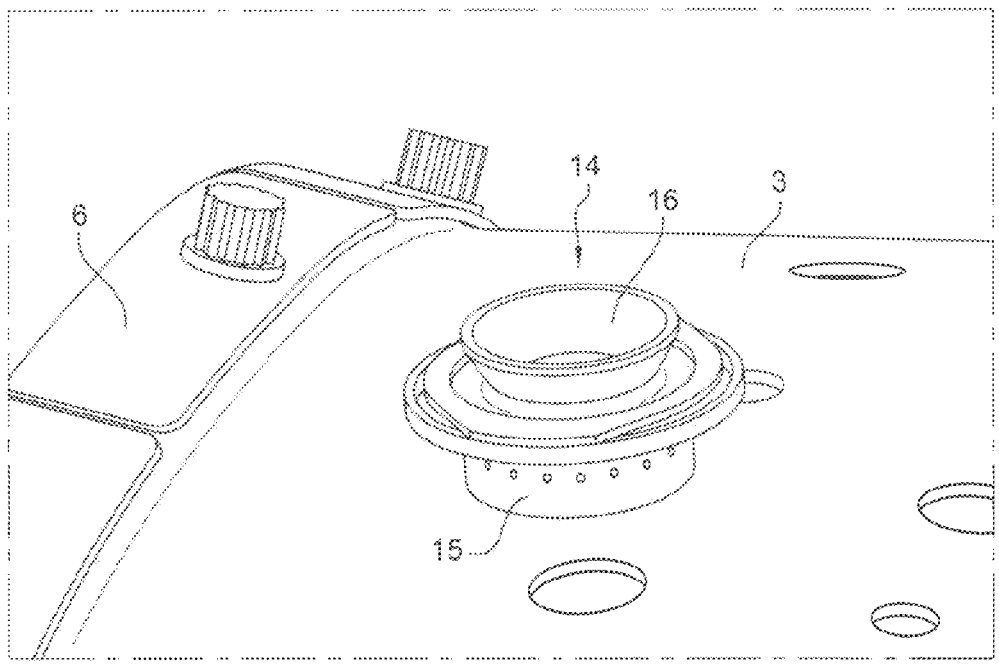

The orifice 13 is fitted with guide means 14 for guiding the plug 11 and comprising a tubular chimney 15 (see FIG. 3) fastened to the outer shroud 3 and opening out into the chamber 10 via said orifice 13, together with a guide 16 surrounding the plug and mounted with axial and transverse clearance on the chimney 15. A guide portion extends into the air flow stream situated outside the chamber. As mentioned above, the air that flows in said stream presses the guide against the plug under the combined effect of the vibration in operation, and can cause the guide to turn relative to the plug, thereby leading to more or less rapid wear of the plug.

Figure 5:
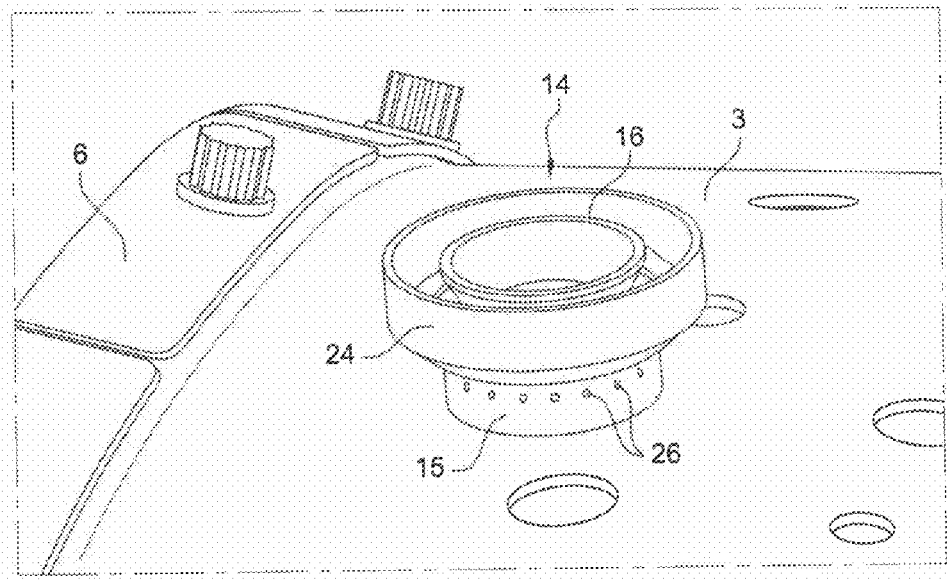
FIG. 5 is a view corresponding to FIG. 4 showing guide means of the combustion chamber of the invention.
Figure 6:
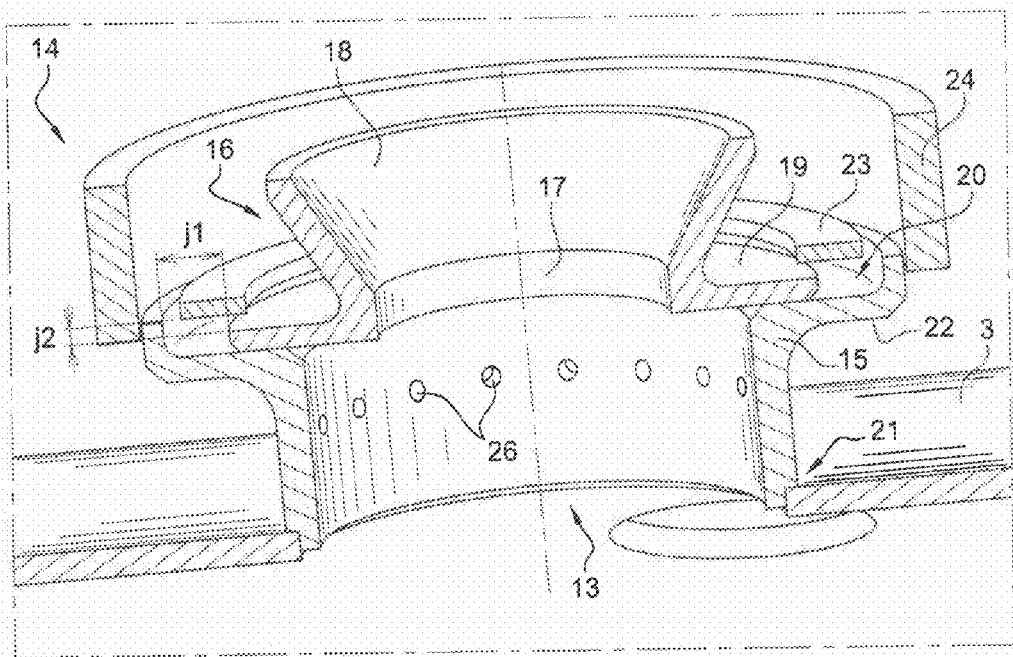
FIG. 6 is a perspective view in midsection of the FIG. 5 guide means.

As can be seen in FIGS. 5 and 6, the guide means of the invention comprise a guide 16 having a cylindrical inside surface 17 for surrounding the plug 11, which surface is connected at its end beside the outer casing 2 to a frustoconical surface 18, and at its opposite end to an annular collar 19 for being engaged with clearance in an inner annular groove 20 of the chimney 15.

The chimney is generally tubular in shape and circular in section. A radially inner end 21 of the chimney 15 is mounted on and welded to the shroud 3 via a shoulder bearing against the edge of the orifice 13 and facilitating positioning of the chimney 15.

The outer end of the chimney includes an annular rim 22 extending radially outwards relative to the axis of the chimney and having an annular plate 23 fastened thereto that extends parallel to the rim 22 and that co-operates therewith to define the inner annular groove 20.

The collar 19 of the guide extends in the annular groove 20 with radial clearance j1 being formed between the peripheral edge of the collar 19 and the end wall of the groove 20, an axial clearance j2 being formed between the collar 19 and the annular wall 23.

These clearances j1, j2 and the sliding of the plug 11 in the guide 16 serves to compensate the relative movements and shifts between the ignition plug 11 and the chimney 15 that are caused by the expansions due to the high temperatures that appear when the turbomachine is in operation.

According to the invention, a deflector 24 surrounds the portion of the guide 16 that is situated in the air flow stream 25 (see FIG. 1), i.e. the frustoconical surface 18, so as to reduce the aerodynamic pressure on the guide 16 and so as to reduce the contact pressure between the guide 16 and the plug 11.

The deflector 24 is annular in shape and extends over at least 180°, and preferably over 360°, around the guide 16. The deflector is fastened to the annular rim 22 of the chimney 15, e.g. by welding. The height of the deflector 24 is not less than and is preferably greater than the height of the portion 18 of the guide 16 that extends into the air flow stream 25.

Naturally, the deflector 24 could be of some other shape, the essential point being that it is situated upstream from the guide 16 relative to the flow direction of the air in the stream 25.

Cooling holes 26 are also formed through the cylindrical wall of the chimney 15. In operation, air from the peripheral stream 25 enters into the chimney 15 via the holes 26 so as to cool the plug 11.

What is claimed is:

1. A turbomachine combustion chamber including at least one ignition plug carried by an outer casing and extending within guide means carried by a wall of the chamber, the wall forming a body of revolution, and including a tubular guide having the plug passing axially therethrough and mounted with axial and transverse clearance on a chimney fastened to the wall of the chamber and opening out into the chamber, the guide extending at least in part in an air flow stream outside the chamber, wherein the guide means comprise a deflector reducing aerodynamic pressure of the air flow stream on the guide and reducing a contact pressure of the guide on the plug, a distance between the wall of the chamber and a free outer edge of the deflector being greater than a distance between the wall of the chamber and a free outer edge of a portion of the guide that extends in the air flow stream and surrounding an upstream portion of the guide that is situated in the air flow stream, relative to a flow direction in the air flow stream.

2. The combustion chamber according to claim 1, wherein the deflector is carried by the chimney.

3. The combustion chamber according to claim 1, wherein the deflector extends over at least 180° around the guide.

4. The combustion chamber according to claim 1, wherein the deflector extends over 360° around the guide.

5. The combustion chamber according to claim 1, wherein the chimney includes an annular rim extending radially outwards and defining an annular groove for assembling an annular collar of the guide, and wherein the deflector is fastened to the annular rim of the chimney by welding.

6. A turbomachine of an airplane turboprop or turbojet, and including the annular combustion chamber according to claim 1.

* * * * *